Dec. 4, 1934.  A. Y. DODGE  1,982,798
BRAKE
Original Filed Aug. 25, 1923

INVENTOR
ADIEL Y. DODGE
BY
ATTORNEY

Patented Dec. 4, 1934

1,982,798

UNITED STATES PATENT OFFICE 1,982,798

BRAKE

Adiel Y. Dodge, South Bend, Ind., assignor to Bendix Brake Company, South Bend, Ind., a corporation of Illinois Application August 25, 1928, Serial No. 302,033
Renewed March 7, 1932

4 Claims. (Cl. 188—78)

This invention relates to brakes and is illustrated as embodied in an internal expanding brake for an automobile. An object of the invention is to provide a simple and inexpensive brake which has a powerful servo action.

Various features of novelty relate to the arrangement of a servo shoe having spaced webs straddling the ends of the other shoes or their equivalents and arranged for direct thrust engagement with laterally extending members carried by the shoes; to a novel notched arrangement of the ends of the shoes permitting them to anchor against fixed pivots without interfering with the movement of one or the other of the shoes away from its pivot, according to which direction the drum is turning when the brake is applied; and to a novel connection between the floating shoes which make up the main friction means of the brake.

The above and other objects and features of the invention will be apparent from the following description of one illustrative embodiment shown in the accompanying drawing, in which.

Figure 1:
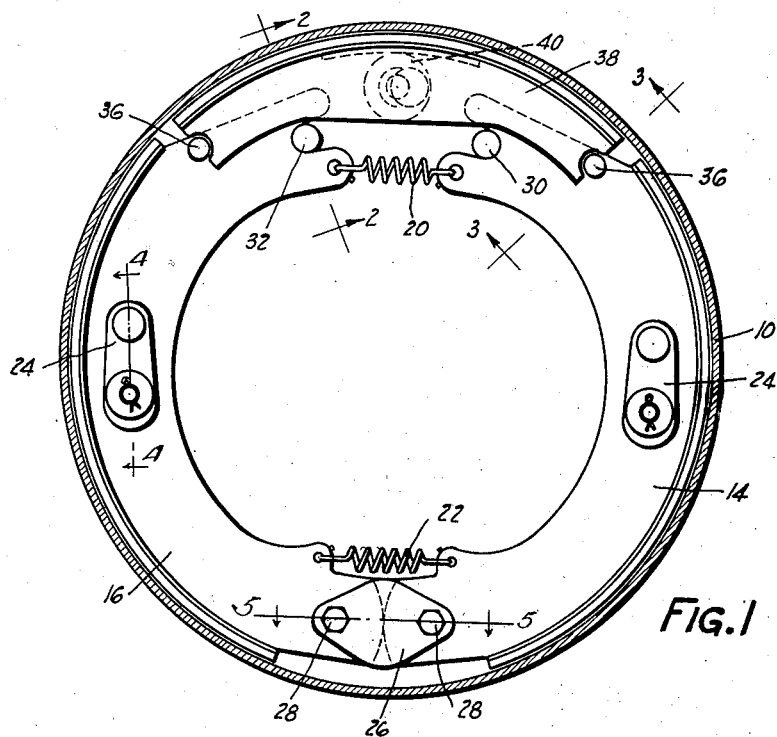
Figure 1 is a vertical section through the brake just inside the head of the brake drum and showing the brake shoes in side elevation.
Figure 2:
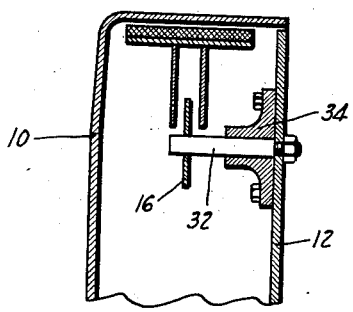
Figure 2 is a partial radial section on the line 2—2 of Figure 1 and showing one of the brake anchors.
Figure 3:
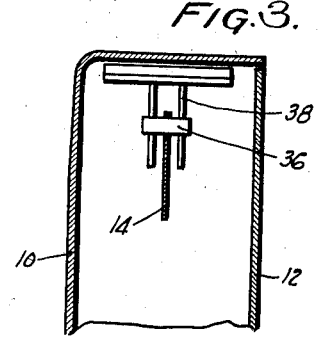
Figure 3 is a partial radial section on the line 3—3 of Figure 1 and showing the thrust engagement between the servo shoe and one of the main shoes.
Figure 4:
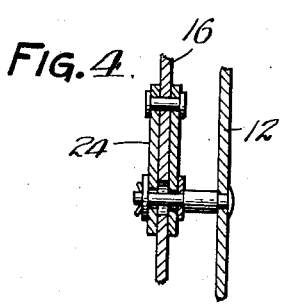
Figure 4 is a sectional view substantially on line 4—4, Figure 1.
Figure 5:
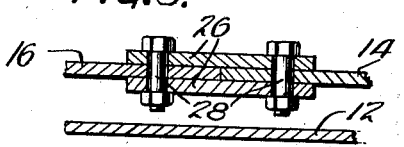
Figure 5 is a sectional view substantially on line 5—5, Figure 1.

The illustrated brake includes a rotatable drum 10, at the open side of which is a suitable support such as the usual backing plate 12, and within which is arranged the friction means of the brake. Preferably the friction means is of the floating type arranged to anchor at one end when the drum is turning in one direction and at the other end when the drum is turning in the other direction, and it may include a pair of interchangeable shoes 14 and 16 which are shown formed with centrally arranged single stiffening webs and which are yieldingly connected at the top and the bottom of the brake by return springs 20 and 22. The idle positions of the shoes 14 and 16 are determined by any suitable stop devices 24.

At their lower ends the shoes 14 and 16 are preferably formed on circular arcs in rolling thrust engagement with each other, as shown in Figure 1, the shoes being, if desired, connected by side plates 26 connected to the shoe ends by pivots 28.

At their upper ends the webs or shoes 14 and 16 are notched to engage fixed anchor pivots 30 and 32 carried by the backing plate 12 and which are shown fixed in brackets 34 secured to the backing plate. Adjacent the anchored or upper ends the webs of shoes 14 and 16 are provided with laterally extending thrust members 36 engaged by notches in the ends of a pair of stiffening webs forming part of a servo shoe 38 which thus overlaps the ends of the shoes 14 and 16. The servo shoe 38 is forced against the drum to apply the brake by any suitable means such as an eccentric crank and roller 40 operated in any desired manner by the usual brake linkage.

In operation the servo shoe 38 when forced against the drum 10 will turn in one direction or the other to thrust against one or the other of the members 36 to force the corresponding shoe 14 or 16 against the drum and away from its anchor pivot 30 or 32, this shoe in turn serving to apply the other shoe which remains anchored.

While one illustrative embodiment has been described in detail, it is not my intention to limit the scope of the invention to that particular embodiment or otherwise than by the terms of the appended claims.

I claim:

1. A brake comprising, in combination, a drum, a pair of fixed anchor pivots, a friction device engageable with the drum and having its ends notched for pivotal engagement with said pivots and yieldingly held against said pivots in such a manner that when the brake is applied one of said ends anchors against its pivot when the drum is turning in one direction and the other of said ends anchors against its pivot when the drum is turning in the other direction, and a servo operating shoe overlapping said ends and arranged to act on the unanchored end when the brake is applied.

2. A brake comprising, in combination, a drum, fixed anchor pivots within the drum, floating friction means within the drum having notched ends embracing said pivots and having transversely extending thrust members adjacent said ends and a servo shoe overlapping said ends and arranged for direct thrust engagement with said members.

3. A brake comprising, in combination, a floating friction device having adjacent anchored ends formed with single centrally arranged webs having laterally extending thrust members, and a servo shoe having a pair of webs straddling the webs of the friction device and formed at their ends for thrust engagement with said members.

4. A brake friction device comprising a pair of shoes having webs the ends of which are rounded and in direct rolling thrust engagement with each other, a pair of plates embracing between them said engaging ends of the webs and holding them in alignment, and pivots connecting the respective webs to said plates.

ADIEL Y. DODGE.